United States Patent
Reiche

(10) Patent No.: US 9,808,721 B2
(45) Date of Patent: *Nov. 7, 2017

(54) CONDITIONAL ACCESS TO AREAS IN A VIDEO GAME

(71) Applicant: Activision Publishing, Inc., Santa Monica, CA (US)

(72) Inventor: Paul Reiche, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,693

(22) Filed: Nov. 10, 2015

(65) Prior Publication Data

US 2016/0059132 A1   Mar. 3, 2016

Related U.S. Application Data

(63) Continuation of application No. 13/109,926, filed on May 17, 2011, now Pat. No. 9,180,378.

(51) Int. Cl.
  *A63F 13/69* (2014.01)
  *A63F 13/79* (2014.01)
  *A63F 13/40* (2014.01)

(52) U.S. Cl.
  CPC .............. *A63F 13/69* (2014.09); *A63F 13/10* (2013.01); *A63F 13/79* (2014.09); *A63F 2300/609* (2013.01)

(58) Field of Classification Search
  CPC .... A63F 13/69; A63F 2300/609; A63F 13/79; A63F 13/10
  See application file for complete search history.

(56) References Cited

U.S. PATENT DOCUMENTS

| | | |
|---|---|---|
| 4,840,602 A | 6/1989 | Rose |
| 5,413,355 A | 5/1995 | Gonzalez |
| 5,533,920 A | 7/1996 | Arad et al. |
| 5,661,470 A | 8/1997 | Karr |
| 5,752,880 A | 5/1998 | Gabai et al. |

(Continued)

FOREIGN PATENT DOCUMENTS

WO   WO 2005/050948   6/2005

OTHER PUBLICATIONS

Joint Technical Committee ISO/IEC JTC1/SC17, Information Technology, Subcommittee SC17, Final Committee Draft ISO/IEC 14443-3, Identification Cards—Contactless Integrated Circuit(s) Cards Proximity Cards, Part 3: Initialization and Anticollision. Jun. 11, 1999.

(Continued)

*Primary Examiner* — Milap Shah
*Assistant Examiner* — Anh Vo V Nguyen
(74) *Attorney, Agent, or Firm* — Klein, O'Neill & Singh, LLP

(57) ABSTRACT

A video game includes conditional access to areas of the game. An area may be unlocked when particular game characters are at an entrance to the area. An area may be unlocked for a particular character, for all characters, or for categories of characters. Categories of characters may include characters of a particular type, characters of a particular skill level, characters controlled by a particular game player, and characters previously played in the video game.

10 Claims, 5 Drawing Sheets

(56) References Cited

U.S. PATENT DOCUMENTS

| | | |
|---|---|---|
| 5,766,077 A | 6/1998 | Hongo |
| 5,810,666 A | 9/1998 | Mero et al. |
| 5,853,327 A | 12/1998 | Gilboa |
| 5,873,765 A | 2/1999 | Rifkin et al. |
| 6,056,618 A | 5/2000 | Larian |
| 6,083,073 A | 7/2000 | McFarlane et al. |
| 6,167,353 A | 12/2000 | Piernot et al. |
| 6,290,565 B1 | 9/2001 | Galyean, III et al. |
| 6,354,947 B1 | 3/2002 | Dobrusskin et al. |
| 6,491,566 B2 | 12/2002 | Peters et al. |
| 6,544,097 B1 | 4/2003 | Bain |
| 6,709,336 B2 | 3/2004 | Siegel et al. |
| 6,729,934 B1 | 5/2004 | Driscoll et al. |
| 6,737,957 B1 | 5/2004 | Petrovic et al. |
| 6,761,637 B2 | 7/2004 | Weston et al. |
| 6,773,325 B1 | 8/2004 | Mawle et al. |
| 6,773,326 B2 | 8/2004 | Jarvis |
| 6,796,908 B2 | 9/2004 | Weston |
| 6,905,391 B2 | 6/2005 | Soto et al. |
| 6,965,298 B2 | 11/2005 | Feinberg |
| 6,967,566 B2 | 11/2005 | Weston et al. |
| 7,001,276 B2 | 2/2006 | Shinoda |
| 7,066,781 B2 | 6/2006 | Weston |
| 7,081,033 B1 | 7/2006 | Mawle et al. |
| 7,244,183 B1 | 7/2007 | England |
| 7,297,063 B2 | 11/2007 | Fujisawa et al. |
| 7,331,857 B2 | 2/2008 | MacIver |
| 7,338,377 B2 | 3/2008 | Shinoda |
| 7,387,559 B2 | 6/2008 | Sanchez-Castro et al. |
| 7,425,169 B2 | 9/2008 | Ganz |
| 7,465,212 B2 | 12/2008 | Ganz |
| 7,488,231 B2 | 2/2009 | Weston |
| 7,500,917 B2 | 3/2009 | Barney et al. |
| 7,502,759 B2 | 3/2009 | Hannigan et al. |
| 7,524,246 B2 | 4/2009 | Briggs et al. |
| 7,534,157 B2 | 5/2009 | Ganz |
| 7,568,964 B2 | 8/2009 | Ganz |
| 7,604,525 B2 | 10/2009 | Ganz |
| 7,614,958 B2 | 11/2009 | Weston et al. |
| 7,618,303 B2 | 11/2009 | Ganz |
| 7,677,948 B2 | 3/2010 | Ganz |
| 7,789,726 B2 | 9/2010 | Ganz |
| 7,808,385 B2 | 10/2010 | Zheng |
| 7,843,471 B2 | 11/2010 | Doan et al. |
| 7,846,004 B2 | 12/2010 | Ganz |
| 7,850,527 B2 | 12/2010 | Barney et al. |
| 7,862,428 B2 | 1/2011 | Borge |
| 7,878,905 B2 | 2/2011 | Weston et al. |
| 7,883,416 B2 | 2/2011 | Dobrusskin et al. |
| 7,883,420 B2 | 2/2011 | Bradbury et al. |
| 7,909,697 B2 | 3/2011 | Zheng |
| 7,982,613 B2 | 7/2011 | Zheng |
| 8,066,571 B2 | 11/2011 | Koster et al. |
| 8,157,611 B2 | 4/2012 | Zheng |
| 2002/0077182 A1* | 6/2002 | Swanberg ............... A63F 13/10 463/43 |
| 2003/0037075 A1* | 2/2003 | Hannigan ............... G06Q 30/02 715/201 |
| 2003/0076369 A1 | 4/2003 | Resner et al. |
| 2003/0190940 A1* | 10/2003 | Gordon ................ A63F 13/005 463/9 |
| 2004/0143852 A1 | 7/2004 | Meyers |
| 2004/0214642 A1 | 10/2004 | Beck |
| 2005/0059483 A1 | 3/2005 | Borge |
| 2006/0273909 A1* | 12/2006 | Heiman ................ A63H 33/00 340/572.7 |
| 2007/0015588 A1 | 1/2007 | Matsumoto et al. |
| 2007/0088656 A1* | 4/2007 | Jung .................... G06Q 30/018 705/38 |
| 2007/0093172 A1 | 4/2007 | Zheng |
| 2007/0143679 A1 | 6/2007 | Resner |
| 2007/0191096 A1 | 8/2007 | Tanaka |
| 2007/0197297 A1 | 8/2007 | Witchey |
| 2007/0211047 A1 | 9/2007 | Doan et al. |
| 2007/0250597 A1 | 10/2007 | Resner et al. |
| 2007/0256716 A1 | 11/2007 | Resner et al. |
| 2008/0085773 A1 | 4/2008 | Wood |
| 2008/0140528 A1 | 6/2008 | Ganz et al. |
| 2008/0141367 A1 | 6/2008 | Ganz et al. |
| 2008/0153594 A1 | 6/2008 | Zheng |
| 2008/0163055 A1 | 7/2008 | Ganz et al. |
| 2008/0214253 A1 | 9/2008 | Gillo et al. |
| 2008/0274805 A1 | 11/2008 | Ganz et al. |
| 2008/0274806 A1 | 11/2008 | Ganz et al. |
| 2008/0274811 A1 | 11/2008 | Ganz et al. |
| 2008/0275789 A1 | 11/2008 | Ganz et al. |
| 2009/0005139 A1 | 1/2009 | Morimoto |
| 2009/0053970 A1 | 2/2009 | Borge |
| 2009/0054155 A1 | 2/2009 | Borge |
| 2009/0063271 A1 | 3/2009 | Ganz et al. |
| 2009/0106671 A1 | 4/2009 | Olson et al. |
| 2009/0116641 A1* | 5/2009 | Bokor ................ H04L 63/061 380/44 |
| 2009/0124165 A1 | 5/2009 | Weston |
| 2009/0132267 A1 | 5/2009 | Ganz |
| 2009/0132357 A1 | 5/2009 | Ganz |
| 2009/0132656 A1 | 5/2009 | Ganz |
| 2009/0137185 A1 | 5/2009 | Zheng |
| 2009/0150418 A1* | 6/2009 | Shuster ................ A63F 13/12 |
| 2009/0157876 A1 | 6/2009 | Lection |
| 2009/0158210 A1 | 6/2009 | Cheng et al. |
| 2009/0204420 A1 | 8/2009 | Ganz |
| 2009/0204908 A1 | 8/2009 | Ganz et al. |
| 2009/0228557 A1 | 9/2009 | Ganz et al. |
| 2009/0234948 A1 | 9/2009 | Garbow et al. |
| 2009/0235191 A1 | 9/2009 | Garbow et al. |
| 2009/0240659 A1 | 9/2009 | Ganz et al. |
| 2009/0248544 A1 | 10/2009 | Ganz |
| 2009/0254434 A1 | 10/2009 | Ganz et al. |
| 2009/0307609 A1 | 12/2009 | Ganz et al. |
| 2009/0309891 A1 | 12/2009 | Karkanias et al. |
| 2009/0318234 A1 | 12/2009 | Christensen et al. |
| 2010/0042486 A1 | 2/2010 | Borst et al. |
| 2010/0058235 A1 | 3/2010 | Borst |
| 2010/0107214 A1 | 4/2010 | Ganz |
| 2010/0151940 A1 | 6/2010 | Borge |
| 2010/0161443 A1 | 6/2010 | Ganz et al. |
| 2010/0167623 A1 | 7/2010 | Eyzaguirre et al. |
| 2010/0216553 A1 | 8/2010 | Chudley et al. |
| 2010/0293473 A1 | 11/2010 | Borst et al. |
| 2010/0325182 A1 | 12/2010 | Ganz |
| 2011/0086702 A1 | 4/2011 | Borst et al. |
| 2011/0165939 A1 | 7/2011 | Borst et al. |
| 2011/0190047 A1 | 8/2011 | Ganz |
| 2011/0265018 A1 | 10/2011 | Borst et al. |
| 2011/0265041 A1 | 10/2011 | Ganetakos et al. |
| 2011/0269540 A1 | 11/2011 | Gillo et al. |
| 2012/0015699 A1 | 1/2012 | Kalvachev |
| 2012/0021825 A1 | 1/2012 | Harp et al. |
| 2012/0077585 A1 | 3/2012 | Miyamoto et al. |
| 2012/0172131 A1* | 7/2012 | Boswell ................ A63F 13/12 463/42 |
| 2012/0252570 A1 | 10/2012 | Kwant et al. |

OTHER PUBLICATIONS

Atmel, Requirements of ISO/IEC 14443 Type B Proximity Contactless Identification Codes. Nov. 2005.

Microchip, microID 13.56 MHz Rfid System Design Guide. 2004.

Sonmicro, SM130, SM1013 Evaluation Kit, Mifare Brief Technical Information, SMRFID Mifare v1.0 Software, User Manual, Jun. 2006.

Sun, Raymond. "Activision Patent Applications—Prior Art." Apr. 9, 2013. Print.

Sun, Raymond. "Patent Portfolio for Skylanders." Mar. 27, 2013. Print.

U.S. Appl. No. 13/109,926, filed May 17, 2011, Paul Reiche, US 2012-0295700 A1, Office Actions dated Jun. 18, 2012; Sep. 26,

(56) References Cited

OTHER PUBLICATIONS

2013; Jun. 18, 2014; Apr. 1, 2015, Notice of Allowance dated Oct. 2, 2015.

* cited by examiner

CONDITIONAL ACCESS TO AREAS IN A VIDEO GAME

CROSS-REFERENCE TO RELATED APPLICATION

The present application is a continuation of U.S. patent application Ser. No. 13/109,926, filed May. 17, 2011, the disclosure of which is incorporated by reference herein.

BACKGROUND OF THE INVENTION

The present invention relates generally to video games, and more particularly to controlling access to areas in a video game.

Video games provide enjoyment for many. Video games allow game players to participate in a variety of simulated activities, including those that the game players may not be able or desire to experience directly, whether due to cost, danger, or equipment concerns, or simply due to the activity or its surroundings being in the realm of fantasy.

Video games may provide many virtual areas that virtual characters under the control of game players may access. Some of the virtual areas may require the game character to perform particular actions. In a multicharacter or a cooperative multiplayer game, however, repetitively requiring different game characters to perform the game particular actions may detract from game play enjoyment.

BRIEF SUMMARY OF THE INVENTION

In aspects the invention provides conditional access to areas of a video game.

Another aspect of the invention provides a computer implemented method for use in providing a video game, comprising: determining whether an area of the video game should be unlocked; when the area of the video game should be unlocked, determining at least one game character for which the area of the video game should be unlocked; and unlocking the area of the video game to the determined at least one game character.

Another aspect of the invention provides a non-transitory machine-readable medium for a video game, the machine-readable medium comprising program instructions for: determining whether an area of the video game should be unlocked; determining an extent of unlocking for the area of the video game when the area of the video game should be unlocked; and unlocking the area of the video game to the determined extent.

These and other aspects of the invention are more fully comprehended upon study of this disclosure.

DETAILED DESCRIPTION

Figure 1:
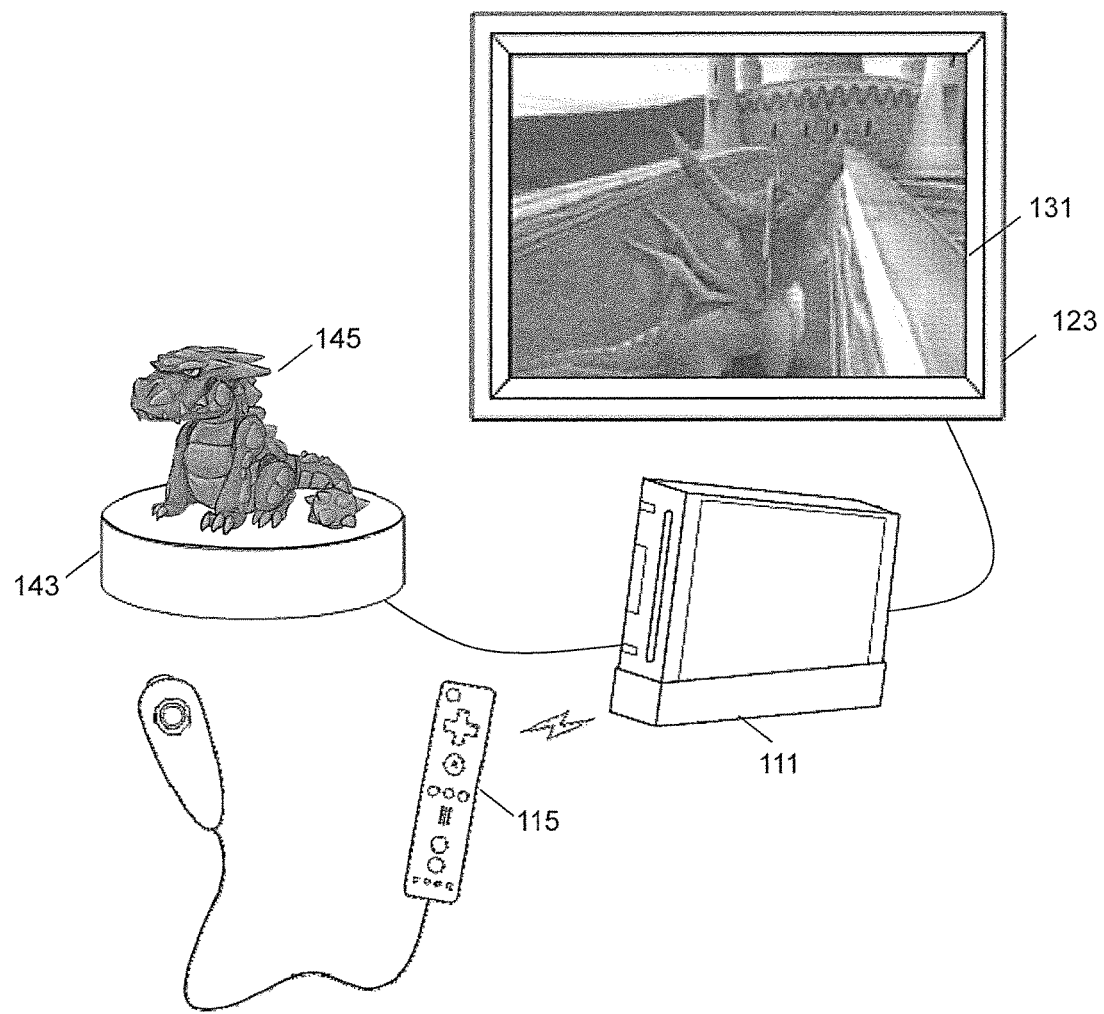
FIG. 1 is an example of a video game system in accordance with aspects of the invention.

FIG. 1 is an example of a video game system in accordance with aspects of the invention. The video game system includes a video game console 111 with a processor for executing program instructions providing for game play, user input devices such as a video game controller 115, a display device 123, and a reader 143. The processor, responsive to inputs from the user input devices and in some embodiments the reader, generally commands display on the display device of game characters in and interacting with a virtual world of game play and possibly each other.

The instructions providing for game play are generally stored on removable media, for example an optical disk. Accordingly, the game console may include an optical drive, for example a DVD-ROM drive, for reading the instructions for game play. In some embodiments, the game console may be instead a personal computer, or a notebook or netbook computer, including, in some instances, a built-in display and built-in or attached user input devices.

The display device is generally coupled to the game console by a cable, although in some embodiments a wireless connection may be used. In many embodiments, the display device is a liquid crystal display. In some embodiments, the display device is a television. A display screen 131 of the display device displays video images of game play, generally as commanded by the processor or other associated circuitry of the game console. In the embodiment of FIG. 1, the display screen shows a screen shot of video game play. As illustrated, the screen shot shows a display of a game character, generally controlled by and animated in accordance with user inputs, approaching what may be considered a castle.

The reader, in some embodiments and as shown in FIG. 1, has a substantially flat upper surface for placement of objects thereon. The reader circuitry detects the presence of a machine readable identifier on or about the reader, with the reader including reader circuitry, for example RFID reader circuitry, optical recognition circuitry, or other reader circuitry, processing circuitry in some embodiments, and communication transmitter or transceiver circuitry for accomplishing this task. The processing circuitry may execute instructions according to firmware that is also stored in the reader. The processing circuitry may control operation of the reader circuitry, and also process signals from the RFID reader to determine data to be sent to the game console. The communication transceiver included in the reader sends reader data to the game console. The communication transceiver may send data, for example as controlled by the processing circuitry.

The toy figure includes a machine-readable identifier, for example a radio frequency identification (RFID) tag or a bar code that may be sensed or read by the reader. The machine-readable information may include an identifier identifying the game character. The machine-readable information allows the reader, or the processor of the game console, to distinguish one toy figure from other toy figures, and the machine-readable information may also include information relating to a variety of aspects of the game character, and, in some embodiments, information about an owner of the toy figure. For example the machine readable information, which in some embodiments is also writeable, may include information relating to a level of the game character, items in the game characters possession, items worn by the game character, an owner of the game character, and other matters. In some embodiments each particular toy figure may have its own separate identifier, for example two otherwise identical toy figures may each have a unique identifier. In some embodiments, however, identical game objects may have the same identifier, and in other embodiments similar game objects may have the same identifier.

A game player generally places game objects, for example a toy figure 145 on the flat surface of the reader during game play. In many cases the toy figure is in the form of and representative of a game character of the game, for example the dragon of FIG. 1. When a toy figure is placed on the reader, the game character represented by the toy figure appears in the game and is added to game play. In most embodiments, while the toy figure is placed on the reader, the game console may, through the receipt of user inputs for example, allow for control of the game character during game play, with the game console determining game character actions and resulting game states and commanding display of game play reflecting game states on the display, which displays the game play.

During game play the game player generally controls the game character, and causes the game character to move about a game defined world, undertaking various adventures and performing various tasks, with game play displayed on the display. The game world includes multiple game areas where the game character may be located. Access to some of the areas may be limited to certain game characters. Passage into game areas may be allowed or disallowed based on, for example, past actions by the character, a type of the character, or a game player with which the character is associated.

Figure 2:
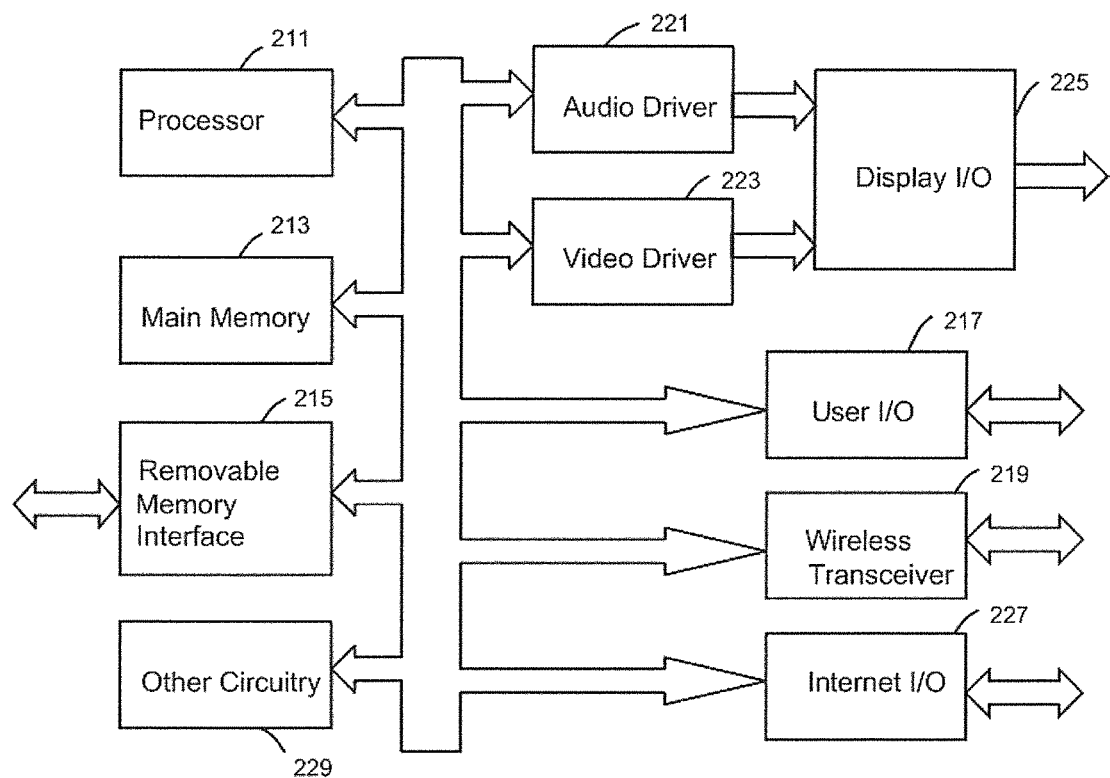
FIG. 2 is an example block diagram of video game console in accordance with aspects of the invention.

FIG. 2 is an example of a block diagram of a processor and associated circuitry, for example for a game console, useful in accordance with aspects of the invention. As shown in FIG. 2 a processor 211 is connected to other components via a bus. The other components include a main memory 213 and a removable memory interface 215 generally coupled to a removable memory device, for example, a DVD-ROM drive. The processor may execute instructions from the removable memory device to control game play and store game state information in the main memory. For example, the instructions may be for determining possible movements, positions, and locations of the game character.

The processor is coupled to an audio driver 221 and a video driver 223. The audio driver produces sound signals and the video driver produces image signals. The sound signals and image signals are transmitted from the game console via a display I/O device 225. The display I/O device generally supplies the sound and image signals to a display device external to the game console.

The processor may also be coupled to a user I/O device 217, a wireless transceiver 219, an Internet I/O device 227, and other circuitry 229. The user I/O device may receive signals from an RF reader and/or signals from a keyboard, a mouse, and/or a game controller, with generally the keyboard, mouse, and/or controller being used by a user and providing user inputs, for example during game play. Alternatively or additionally, the personal computer may receive user inputs via the wireless transceiver. The Internet I/O device provides a communication channel that may be used, for example, for multiple player games.

Figure 3:
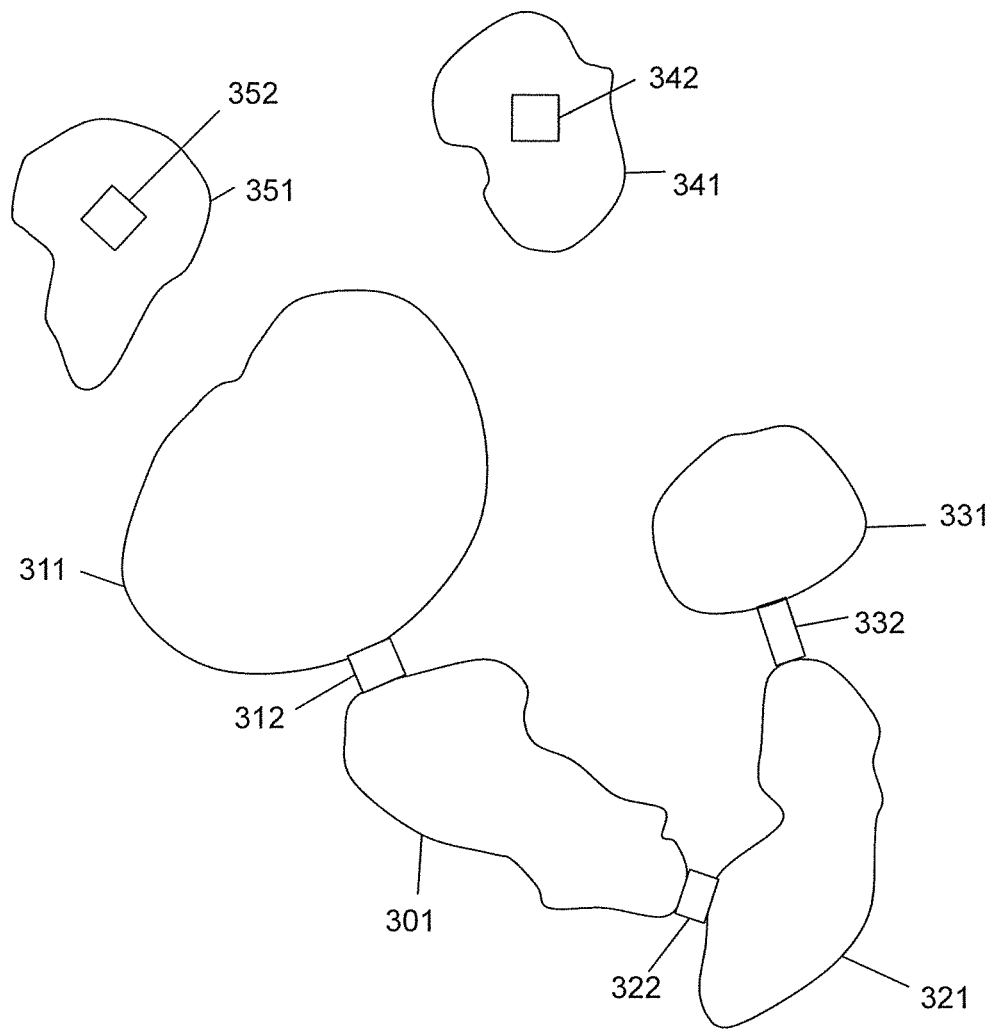
FIG. 3 is a diagram of areas in a video game in accordance with aspects of the invention.

FIG. 3 is a diagram of areas in a video game in accordance with aspects of the invention. The video game includes multiple game areas where players may use their game characters. The areas may include different objects, challenges, and the like. Passage into the areas is restricted by entrances that may conditionally allow or disallow a character to enter the area.

The example video game illustrated in FIG. 3 includes a main or initial area 301. Game characters may generally begin game play in the initial area. Characters in the initial area may move from the initial area to a first area 311 by way of a first entrance 312. The first entrance limits passage to the first area by allowing or disallowing characters to pass through the entrance. Passage may be allowed based, for example on the identity of the character, the type of character, or past game experiences of the characters. When an entrance allows a character to pass into an area, the area is accessible to that character and the area may be considered unlocked with respect to that character.

Characters may also move from the initial area to a second area 321 by way of a second entrance 322. The second entrance limits passage to the second area in a manner similar to that of the first entrance. The determination of whether the entrances allow passage is generally independent for each entrance. Additionally, in some embodiments an area may have multiple entrances and whether the multiple entrances allow passage may be determined jointly or independently. Similar to passage from the first area to the second area by way of the second entrance, a character may pass from the second area to a third area 331 by way of a third entrance 332.

Characters may also move to one of two isolated areas 341, 351. Passage to the isolated areas is allowed or disallowed by corresponding entrances 342, 352. Characters may move or locate to the isolated area, for example by helicopter.

Figure 4:
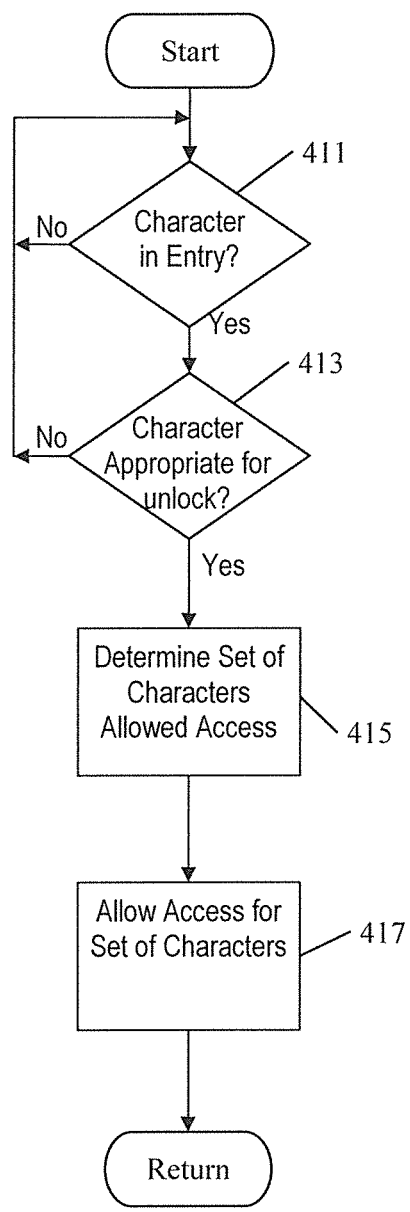
FIG. 4 is a flowchart of a process for determining if a game area should be accessible to game characters, and which game characters, in accordance with aspects of the invention.

FIG. 4 is a flowchart of a process for determining if a game area of a game world of a video game should be accessible to game characters and, if so, which game characters. The process of FIG. 4 may be performed, for example, by the game console of FIG. 1 or the processor, for example as configured by program instructions, in conjunction with associated circuitry, of FIG. 2.

In block 411 the process determines whether a character of the video game is in an entrance to an area. A character may be in the entrance to the area, for example, if the process receives information that a character has been read by a reader capable of reading character related information, for example in embodiments that utilize an RFID reader and toy figures with RFID transmitters, and game play is located at the entrance. Game play may be located at the entrance, for example, if display of game play shows the character at or about the entrance. A character may also be in the entrance to the area when the character has moved to the entrance, for example as commanded by game player input, provided for example by a game controller, with game play status indicating that the character is at the entrance. The process returns to block 411 if a character is not in the entrance to the area; otherwise, if a character is in the entrance to the area, the process continues to block 413.

In block 413 the process determines whether the character at the entrance to the area is an appropriate character for unlocking access to the area. It may be appropriate to unlock access depending, for example, on the type of the character, a performance level or game stage of the character, possessions of the character, tasks performed by the character, or combinations thereof. The process returns to block 411 if the character at the entrance to the area is not an appropriate character for unlocking access to the area; otherwise, if the character at the entrance to the area is an appropriate character for unlocking access to the area, the process continues to block 415.

In block 415 the process determines a set of characters for whom the area should be accessible. In various embodiments the set of characters may be based on characteristics of the character triggering the unlocking or may be based on status of game play. In some embodiments the set of characters is global, in other words all characters. In other embodiments the set of characters is based on a type of the character or a game level of the character. In other embodiments the set of characters is based on which characters have been played by the game player associated with the character triggering the unlocking. In other embodiments the set of characters is provided from a source external to the video game, such as an Internet server. The set of characters indicates which characters may enter the area.

In block 417 the process unlocks the area for the set of characters determined in block 415. The process may unlock the area by setting state information, which may be stored for example in memory of the game console, of the game associated with the area being unlocked. For example, the process may set attributes of an entrance to the area indicating which characters are allowed to pass through the entrance into the area. Additionally, the process may command display, and in some embodiments display a message to a game player indicating which characters may enter the area.

The process thereafter returns.

Figure 5:
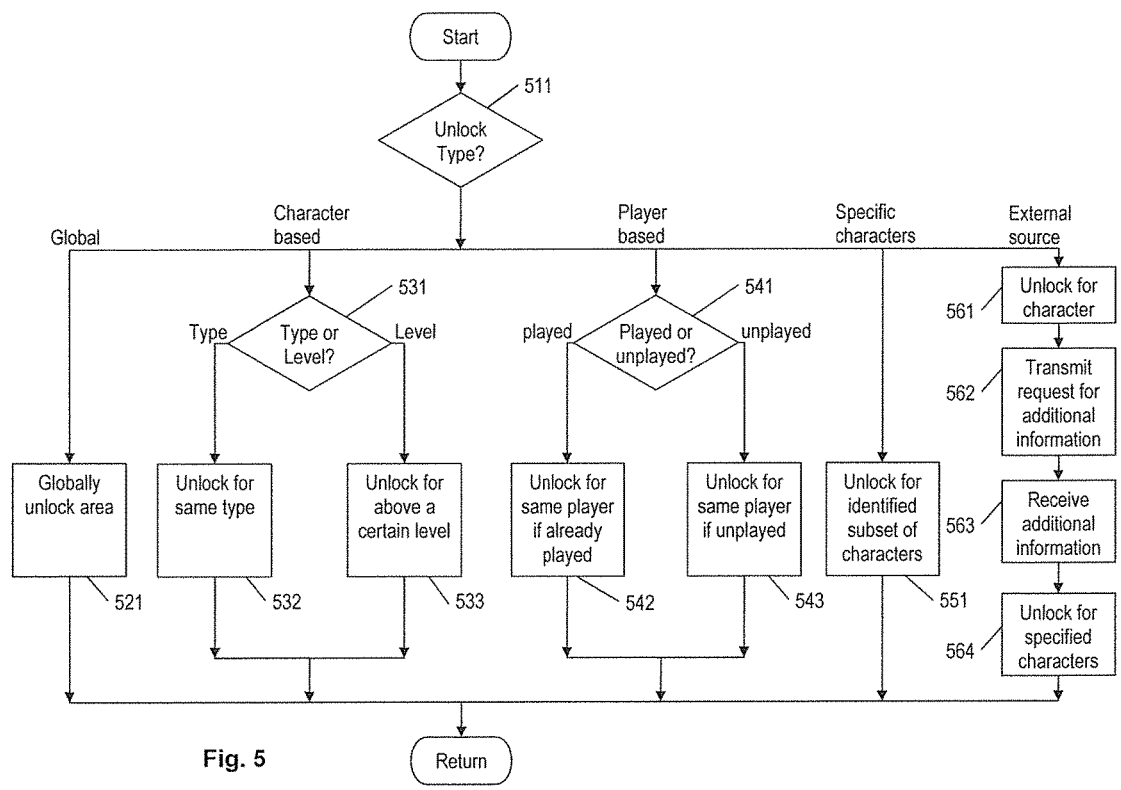
FIG. 5 is a flowchart of a process for conditionally unlocking access to an area of a video game in accordance with aspects of the invention.

FIG. 5 is a flowchart of a process for conditionally unlocking access to an area of a video game. The process of FIG. 4 may be performed, for example, by the game console of FIG. 1 or the processor, for example as configured by program instructions, in conjunction with associated circuitry, of FIG. 2.

In block 511 the process determines a type of unlocking of access to the area. In some embodiments only one type of unlocking may be available, and in such embodiments the process may dispense with performing the functions of block 511. The type of unlocking may be determined based on characteristics of a character triggering the unlocking of the area. The type of unlocking may vary with which area is being unlocked and may vary at different times during game play. For example, the type of unlocking may be determined using a process as illustrated in FIG. 4. The process continues to block 521 if the type of unlocking is global. The process continues to block 531 if the type of unlocking is character based. The process continues to block 541 if the type of unlocking is player based. The process continues to block 551 if the type of unlocking is for specific characters. The process continues to block 561 if the type of unlocking is based on an external source.

In block 521 the process unlocks the area for all game characters. The process thereafter returns.

In block 531 the process determines whether character based unlocking is by type or level. The process continues to block 532 if the unlocking is for characters of a certain type; otherwise, process continues to block 533 if the unlocking is for characters of a certain level. In block 532 the process unlocks the area for characters types that match the type of the character that triggered the unlocking. In some embodiments, there is a hierarchy of character types, for example as genus and species, and the unlocking may be for characters of the same genus or of the same species. In block 533 the process unlocks the area for characters at levels at or above a certain level. In other embodiments the area may be unlocked for characters below a certain level. The level may be determined, for example, using the level of the character that triggered the unlocking or determined based on the area being unlocked. The process thereafter returns.

In block 541 the process determines whether the player based unlocking is for played or unplayed characters. The process continues to block 542 if the unlocking is for played characters; otherwise, process continues to block 543 if the unlocking is for unplayed characters. In block 542 the process unlocks the area for characters that the player whose character triggered the unlocking has previously played in the video game. In block 543 the process unlocks the area for characters that the player has not yet played in the video game. In various embodiments the character that triggered the unlocking may be included in or excluded from the characters for which the area is unlocked. The process thereafter returns.

In block 551 the process unlocks the area for a subset of game characters. The subset of characters may be based on a common characteristic of the characters, for example characters considered to be a team, characters present on a reader, or characters that have a same pre-identified characteristic. The process thereafter returns.

In block 561 the process unlocks the area for the character that triggered the unlocking. In block 562 the process transmits a request for additional information about which characters should be included in the unlocking of the area. The request may be transmitted, for example, to an Internet-connected server that provides information related to the game or characters in the game. The request may be transmitted, for another example, to an Internet connected game server that coordinates game play between remotely located game players. In block 563 the process receives the information requested in block 562. In some embodiments the process may include a timeout if the requested information is not promptly received. The various embodiments the process may retransmit the request for information. When the requested information is not received, the process may perform a default action, such as unlocking the area for subset of characters or the process may return. In block 564 the process unlocks the area for the game characters indicated in the information received in block 563. The information may indicate game characters, for example, by specific identities or characteristics. The process thereafter returns.

The process may, in other embodiments, include additional types of unlocking or may combine features of the types illustrated in FIG. 5. For example, the process may unlock an area for characters of a certain type and that have been previously played in the game. Additionally, in some embodiments, game players may trade characters and the process accordingly may determine whether access to an area changes when a character is owned by a different game player. When the area was previously unlocked, the process may add characters to the unlocking or may remove the previous unlocking.

Aspects of the invention provide for animation routines for game characters. Although aspects of the invention have been described with respect to various specific embodiments, it should be recognized that the invention comprises the novel and non-obvious claims supported by this disclosure.

The invention claimed is:

1. A computer-implemented method for determining whether a game area of a game world is accessible to game characters, comprising:

using a reader with RFID reader circuitry to read machine-readable information stored in one or more toys, the machine-readable information including information identifying corresponding one or more game player controllable video game characters, the reader including a surface for placement of the one or more toys;

presenting a game world having a plurality of game areas, each of said plurality of game areas having at least one entrance to said, at least two of said plurality of game areas directly joined by at least one entrance together, and at least one of said plurality of game areas isolated from the other game areas and not directly joined to any other game area;

determining whether a game player controllable video game character of the one or more game player controllable video game characters is located at an entrance to a particular area of the game world, the particular area of the game world being one of said plurality of game areas of the game world;

when the game player controllable video game character of the one or more game player controllable video game characters is located at the entrance to the particular area of the game world, determining whether the game player controllable video game character being present at the entrance to the particular area of the game world is allowed passage through the entrance to the particular area of the game world, said determining being based at least in part on a determination that the game player controllable video game character at the entrance to the particular area of the game world is of a particular type of game character;

allowing passage through said entrance to the particular area of the game world for a plurality of game player controllable video game characters upon determining that the game player controllable video game character being present at the entrance to the particular area of the game world is allowed passage through said entrance; and wherein the plurality of game player controllable video game characters allowed passage through said entrance to the particular area of the game world comprises a first set of game player controllable video game characters, and wherein the first set of game player controllable video game characters is game player controllable video game characters associated with the one or more toys proximate the reader.

2. The method of claim 1, further comprising commanding display of an indication of which of the plurality of game player controllable video game characters is included in the first set of game player controllable video game characters.

3. The method of claim 1, wherein the plurality of game player controllable video game characters allowed passage through said entrance to the particular area of the game world comprises a second set of game player controllable video game characters, and wherein the second set of game player controllable video game characters is game player controllable video game characters of a type associated with the game player controllable video game character that triggers accessibility of the particular area of the game world.

4. The method of claim 1, wherein the plurality of game player controllable video game characters allowed passage through said entrance to the particular area of the game world comprises a second set of game player controllable video game characters, and wherein the second set of game player controllable video game characters is game player controllable video game characters with a game level at or above a game level of the game player controllable video game character that triggers accessibility of the particular area of the game world.

5. The method of claim 1, wherein the plurality of game player controllable video game characters allowed passage through said entrance to the particular area of the game world comprises a second set of game player controllable video game characters, and wherein the second set of game player controllable video game characters is game player controllable video game characters that a current game player has played in the video game.

6. The method of claim 1, wherein the plurality of game player controllable video game characters allowed passage through said entrance to the particular area of the game world comprises a second set of game player controllable video game characters, and wherein the second set of game player controllable video game characters is game player controllable video game characters that a current game player has not played in the video game.

7. The method of claim 1, wherein the plurality of game player controllable video game characters allowed passage through said entrance to the particular area of the game world comprises a second set of game player controllable video game characters, and further comprising:
   transmitting a request for additional information about accessibility of the particular area of the game world;
   receiving the additional information; and
   including game player controllable video game characters indicated by the additional information in the second set of game player controllable video game characters.

8. The method of claim 1, wherein the plurality of game player controllable video game characters allowed passage through said entrance to the particular area of the game world comprises a second set of game player controllable video game characters, and wherein the combination of the first set and second set of game player controllable video game characters includes all game player controllable video game characters.

9. The method of claim 1, wherein the plurality of game player controllable video game characters allowed passage through said entrance to the particular area of the game world comprises a second set of game player controllable video game characters, and wherein the second set of game player controllable video game characters is game player controllable video game characters in a same subset as the game player controllable video game character at the entrance to the particular area of the game world.

10. The method of claim 9, wherein the subset comprises the game player controllable video game characters associated with the one or more toys proximate the reader.

* * * * *